US012697919B2

(12) United States Patent
Graham

(10) Patent No.: US 12,697,919 B2
(45) Date of Patent: Aug. 4, 2026

(54) EXTENDING LIGHT BAR

(71) Applicant: Yenell Graham, Kitscoty (CA)

(72) Inventor: Harvey Graham, Kitscoty (CA)

(73) Assignee: Yenell Graham, Kitscoty (CA)

( * ) Notice: Subject to any disclaimer, the term of this patent is extended or adjusted under 35 U.S.C. 154(b) by 0 days.

(21) Appl. No.: 19/053,966

(22) Filed: Feb. 14, 2025

(65) Prior Publication Data

US 2025/0269788 A1      Aug. 28, 2025

(30) Foreign Application Priority Data

Feb. 28, 2024    (CA) ...................................... 3230501

(51) Int. Cl.
B60Q 1/26            (2006.01)
(52) U.S. Cl.
CPC .................................. B60Q 1/2692 (2013.01)
(58) Field of Classification Search
CPC ..... B60Q 1/2657; B60Q 1/2692; E01F 9/646;
E04H 12/182

USPC ................................. 362/285, 286, 403, 431
See application file for complete search history.

(56) References Cited

U.S. PATENT DOCUMENTS

| | | | | |
|---|---|---|---|---|
| 4,825,192 A * | 4/1989 | Wells | ....................... | B60R 19/38 |
| | | | | 280/765.1 |
| 2013/0114284 A1* | 5/2013 | Matthews | ............ | B60Q 1/2692 |
| | | | | 362/542 |
| 2014/0362598 A1* | 12/2014 | Racicot | ................... | E01F 9/662 |
| | | | | 362/542 |
| 2016/0347247 A1* | 12/2016 | Espey | ..................... | E01F 9/662 |

* cited by examiner

*Primary Examiner* — Thomas M Sember
(74) *Attorney, Agent, or Firm* — Secant IP, P.L.L.C.

(57) ABSTRACT

An extending light bar has a support body with a first extending arm that slidably engages support body. First extending arm is movable between a first extended position and a first retracted position. In the first extended position, a second end of the first extending arm moves towards a first support end of the support body. At least one light is positioned on the first extending arm and a power source is provided for providing power for the at least one light.

17 Claims, 9 Drawing Sheets

EXTENDING LIGHT BAR

FIELD OF THE DISCLOSURE

The present application relates generally to an extending light bar, and more particularly relates to an extending light bar for use on vehicles and equipment.

BACKGROUND

This section provides background information to facilitate a better understanding of the various aspects of the invention. It should be understood that the statements in this section of this document are to be read in this light, and not as admissions of prior art.

Many different types of vehicles, including emergency vehicles, semi-trucks and tow trucks, utilize lights to warn traffic of their presence. When a flat deck is loaded or a tall trailer is being hauled, the lights may be obscured and this can put operators in danger as traffic is not aware of them until upon them. Traffic cones and flares may be used but can be dangerous to place and retrieve and may not be highly visible in some situations.

BRIEF SUMMARY

There is provided an extending light bar that has a support body with a first support end and a second support end. A first extending arm slidably engages the support body. The first extending arm has a first end and a second end. The first extending arm is movable between a first extended position and a first retracted position. In the first extended position, the second end of the first extending arm moves towards the first support end of the support body. At least one light is positioned on the first extending arm and a power source is provided for the at least one light.

In one embodiment, a second extending arm is also provided. The second extending arm has a first end and a second end. The first end of the second extending arm is positionable adjacent the first end of the first extending arm. The second extending arm slidably engages the support body. The second extending arm is movable between a second extended position and a second retracted position. In the second extended position, the first end of the second extending arm moves towards the second support end of the support body. At least one of the at least one lights being positioned on the second extending arm.

In one embodiment, each of the first extending arm and the second extending arm have a locking mechanism for maintaining position on the support body.

In one embodiment, the power source is a vehicle.

In one embodiment, the at least one light is a light bar.

In one embodiment, at least one light is positioned adjacent the second end of the first extending arm.

In one embodiment, at least one light is positioned adjacent the second end of the second extending arm.

In one embodiment, the first extending arm is movable along an exterior surface of the support bar. The first extending arm may surround at least a portion of the support bar such hat the first extending arm moves laterally relative to the support bar.

In one embodiment, the second extending arm is movable along the exterior surface of the support bar. The second extending arm may surround at least a portion of the support bar such that the first extending arm moves laterally relative to the support bar.

In one embodiment, the first extending arm is moved manually.

In one embodiment, the second extending arm is moved manually.

In another embodiment, the first extending arm is moved by a linear actuator.

In another embodiment, the second extending arm is moved by a linear actuator.

In one embodiment, in the retracted position the first end of the first extending arm and the first end of the second extending arm are in contact at a central point of the support bar.

In one embodiment, the first extending arm is movable to an alternative extended position in which the first end of the first extending arm moves towards the second support end of the support body.

In one embodiment, the support body is horizontal.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
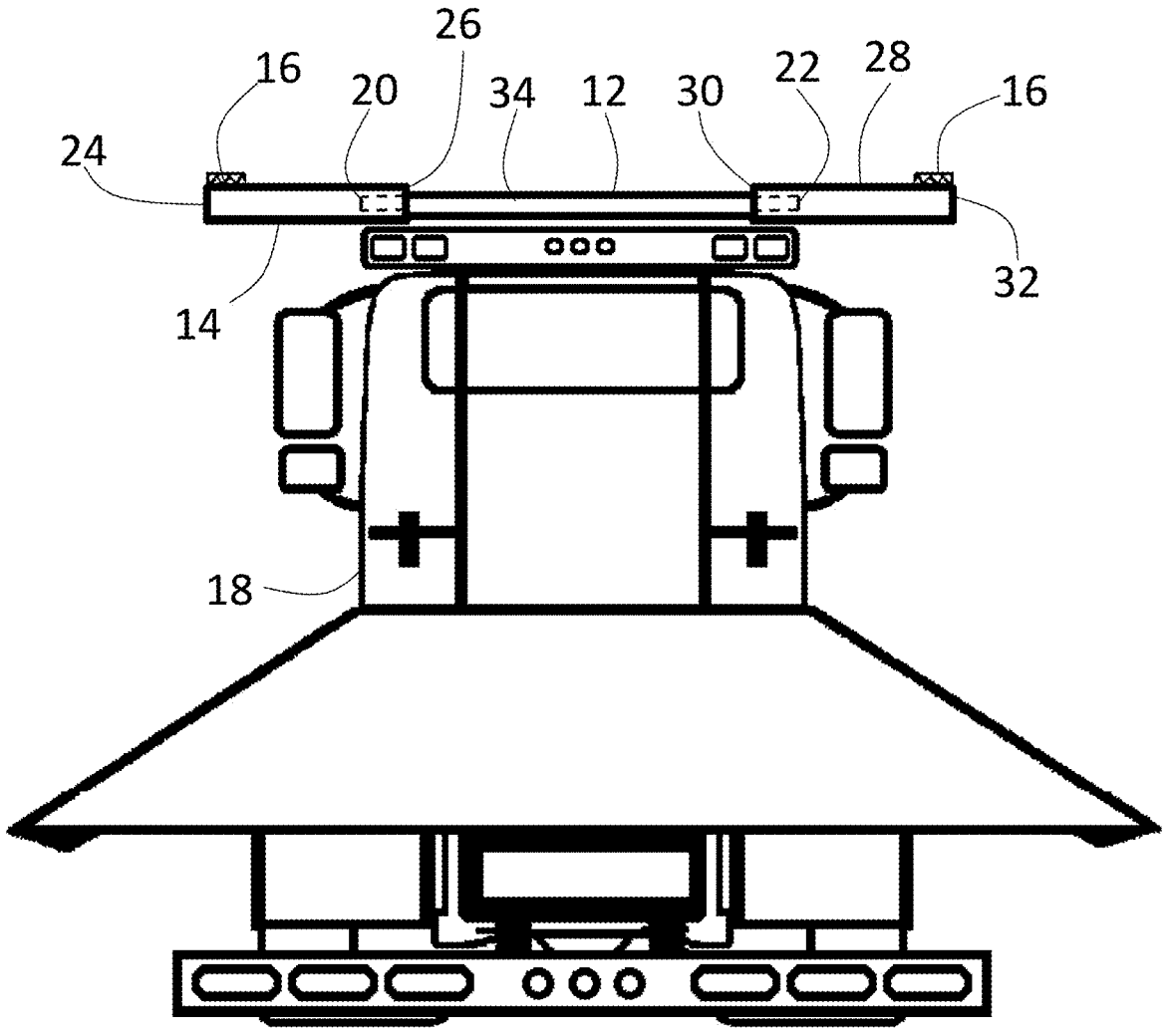
FIG. 1 is a rear elevation view, partially in section, of a first variation of the extending light bar in the extending position.

An extending light bar, generally identified by reference numeral 10, will now be described with reference to FIG. 1 through FIG. 13.

Figure 4:
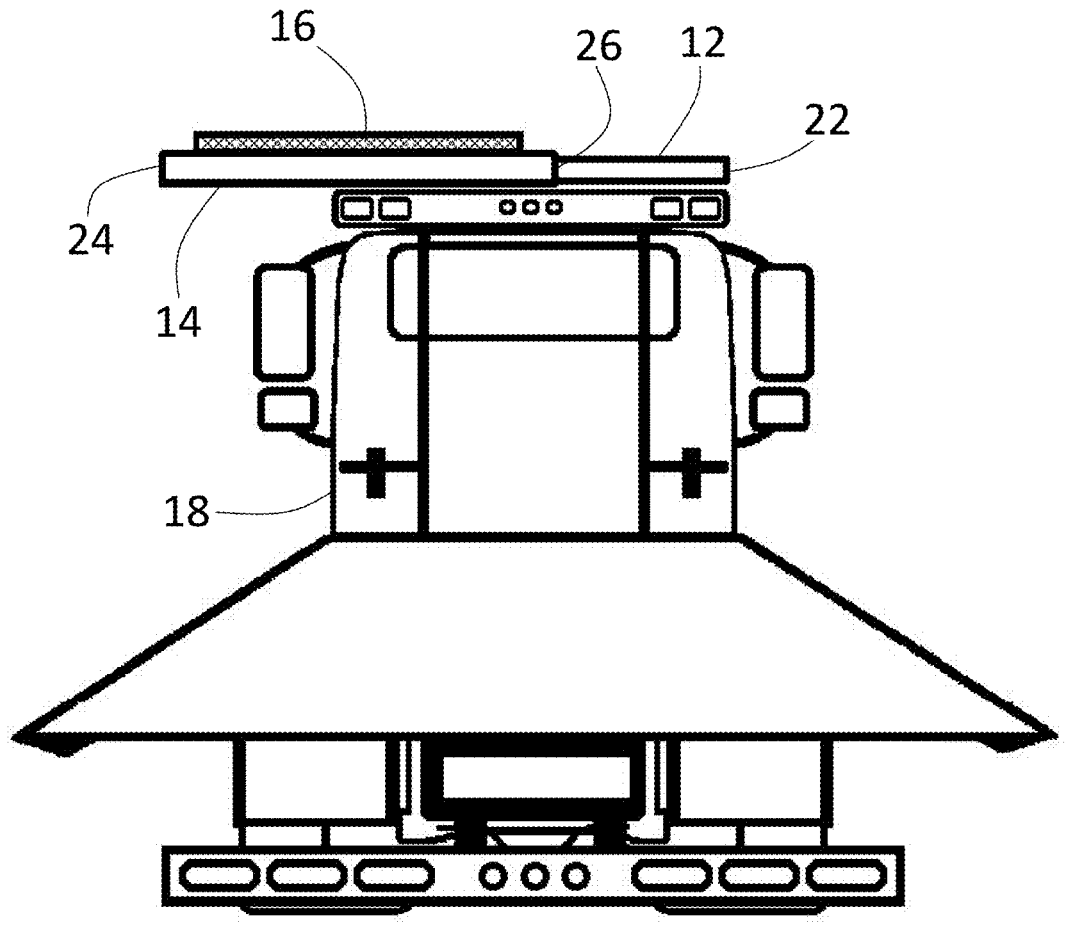
FIG. 4 is a rear elevation view of the second variation of the extending light bar extended to the left.
Figure 7:
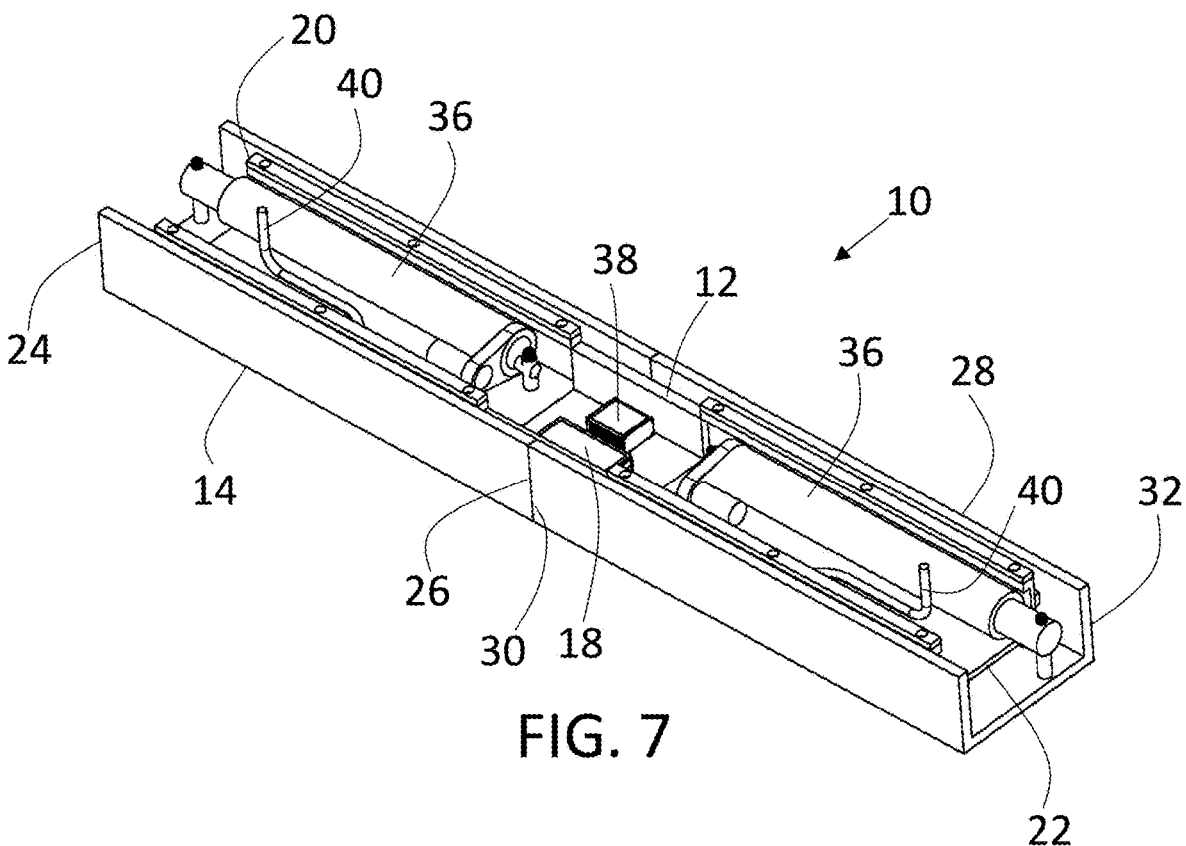
FIG. 7 is a perspective view, in section, of the first variation of the extending light bar in the retracted position.
Figure 9:
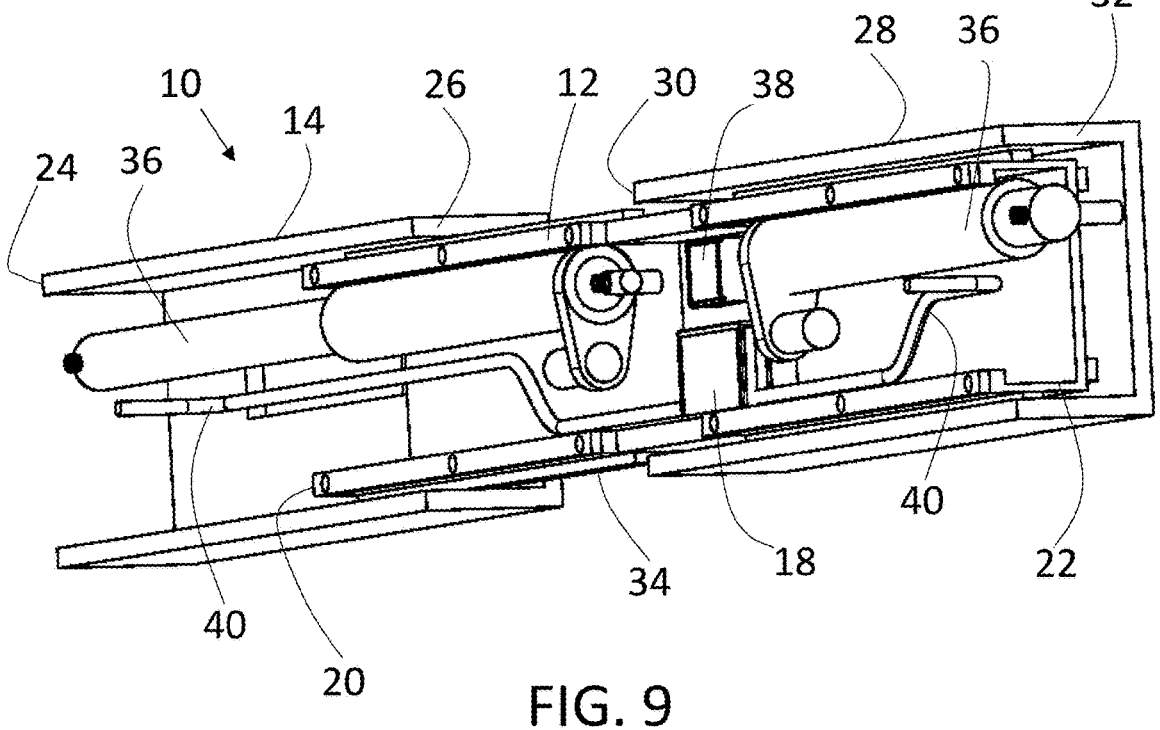
FIG. 9 is a perspective view, in section, of the first variation of the extending light bar with one side extended.
Figure 10:
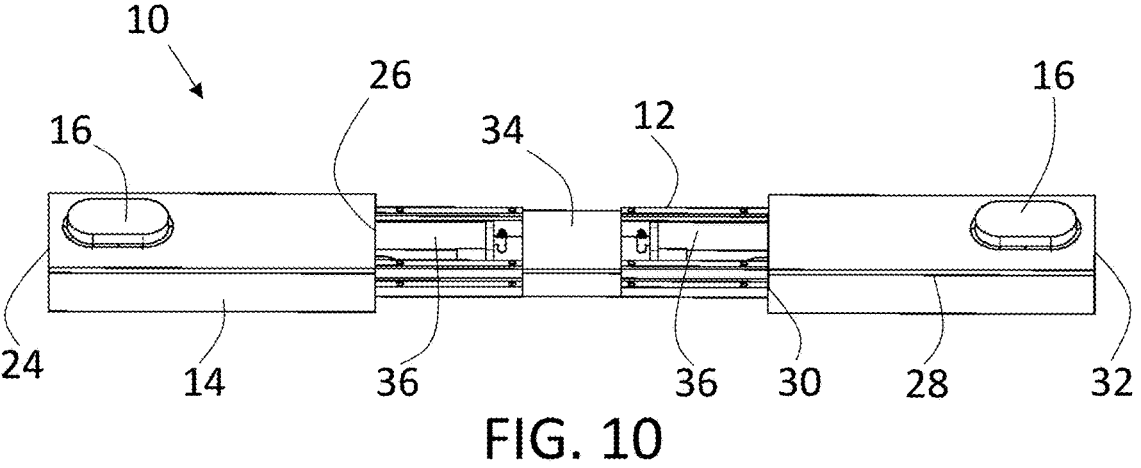
FIG. 10 is a perspective view, partially in section, of the first variation of the extending light bar with both sides extended.
Figure 11:
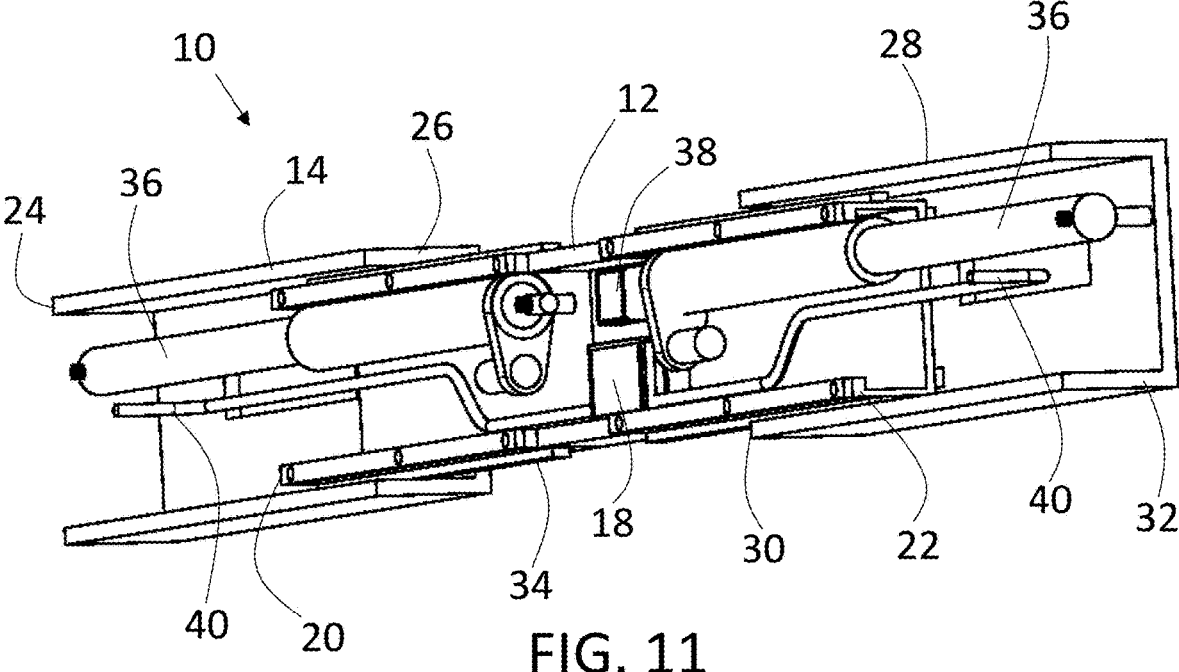
FIG. 11 is a perspective view, in section, of the first variation of the extending light bar with both sides extended.
Figure 12:
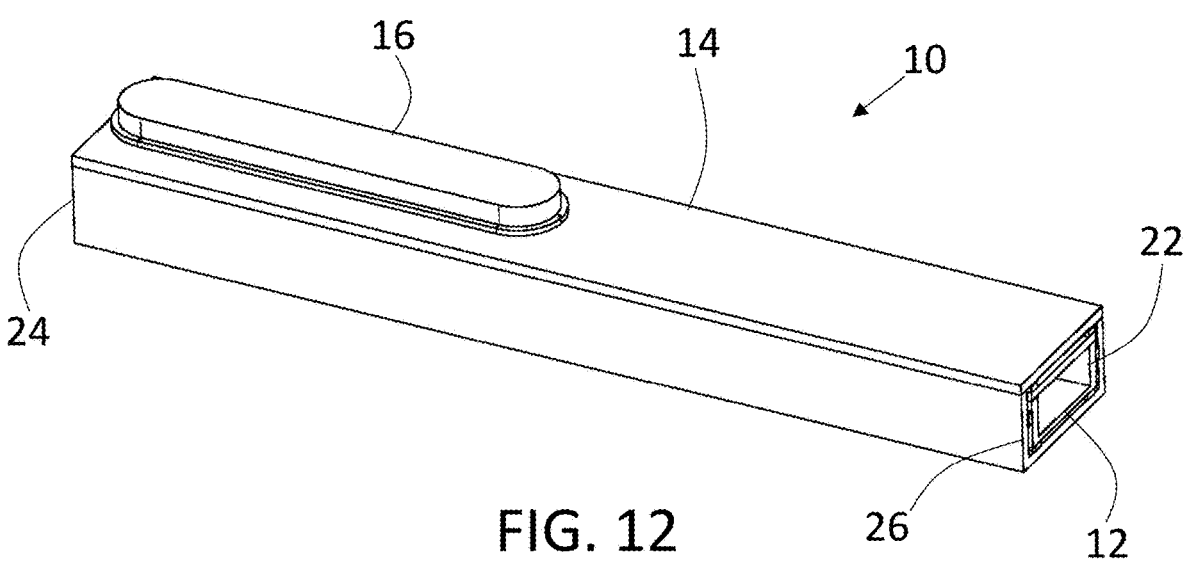
FIG. 12 is a perspective view of the second variation of the extending light bar in a retracted position.
Figure 13:
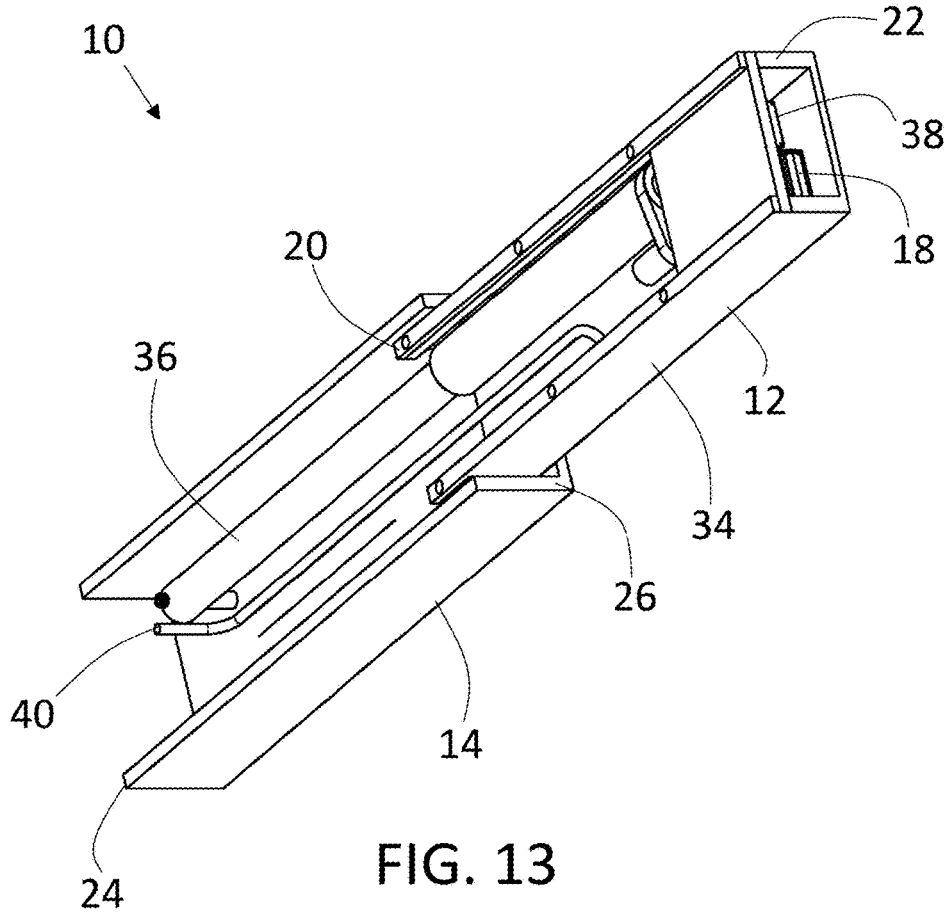
FIG. 13 is a perspective view, partially in section, of the second variation of the extending light bar in an extended position.

Referring to FIG. 13, an extending light bar 10 has a support body 12, a first extending arm 14, at least one light 16, and a power source 18. Support body 12 has a first support end 20 and a second support end 22. In the embodiments shown in FIG. 1-FIG. 5, support body 12 is positioned in a horizontal orientation, however it will be understood by a person skilled in the art that other orientations of support body 12 are possible. First extending arm 14 has a first end 24 and a second end 26. First extending arm 14 slidably engages support body 12 and is movable between a first extended position, shown in FIG. 1 and FIG. 4, and a first retracted position, shown in FIG. 2 and FIG. 3. Referring to FIG. 1 and FIG. 4, in the first extended position, second end 26 of first extending arm 14 moves towards first support end 20 of support body 12. At least one light 16 is positioned on first extending arm 14. It will be understood by a person of skill in the art that different types, sizes, shapes, and number of lights may vary. In the embodiment shown in FIG. 3-FIG. 5 and FIG. 12-FIG. 13, light 16 is a light bar. In the embodiment shown in FIG. 1 and FIG. 2, light 16 is a flashing light. Power source 18 provides power for lights 16. Power source may be a vehicle to which support body 12 is attached, as seen in FIG. 1-FIG. 5, or other any other suitable power source including, but not limited to, a battery or generator. FIG. 7, FIG. 9, and FIG. 11 show the use of a battery as power source 18.

Figure 5:
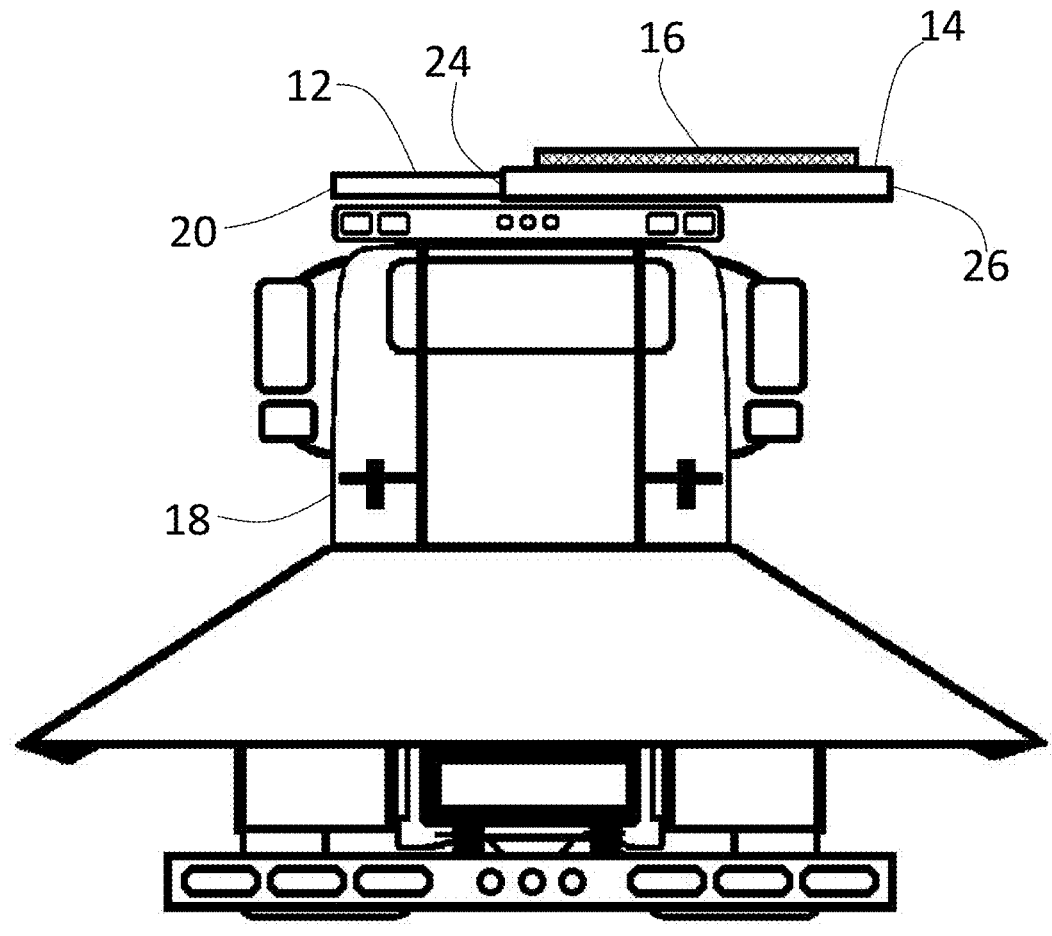
FIG. 5 is a rear elevation view of the second variation of the extending light bar extending to the right.

In the embodiment shown in FIG. 5, first extending arm 14 may be movable to an alternative extended position in which first end 24 of first extending arm 14 moves towards second support end 22 of support body 12. This allows first extending arm 14 to move in either direction along support bar 12.

Figure 6:
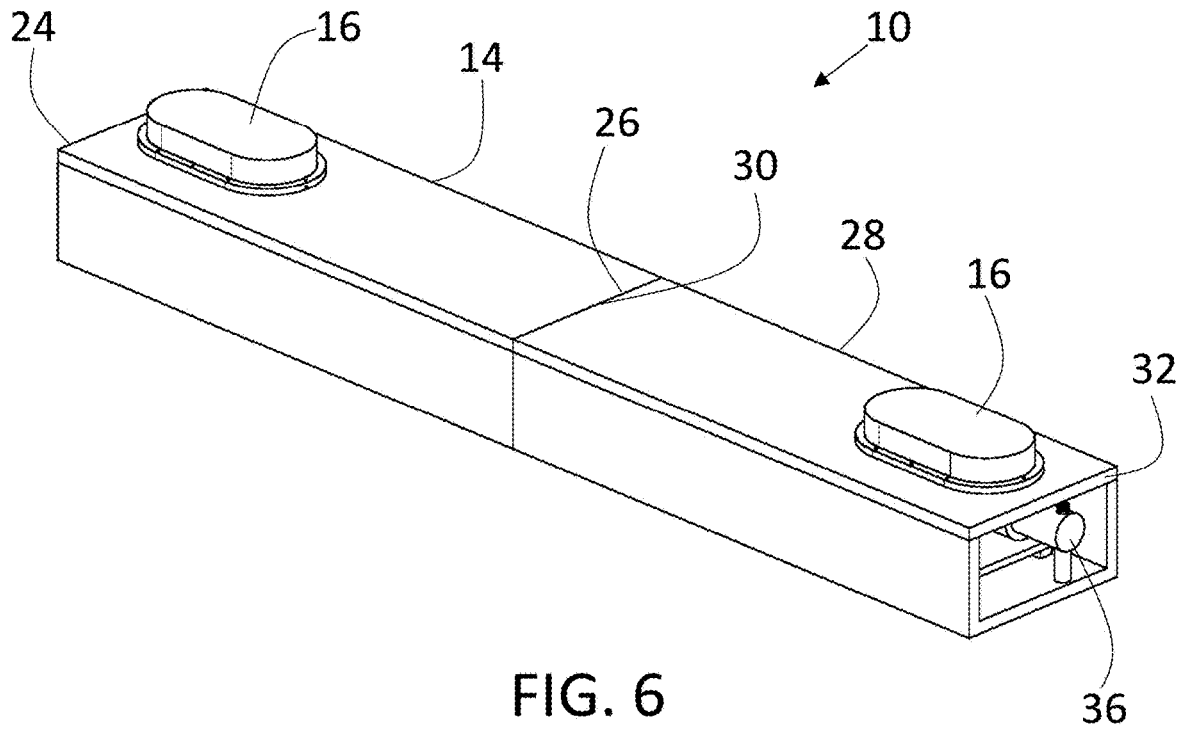
FIG. 6 is a perspective view of the first variation of the extending light bar in the retracted position.
Figure 8:
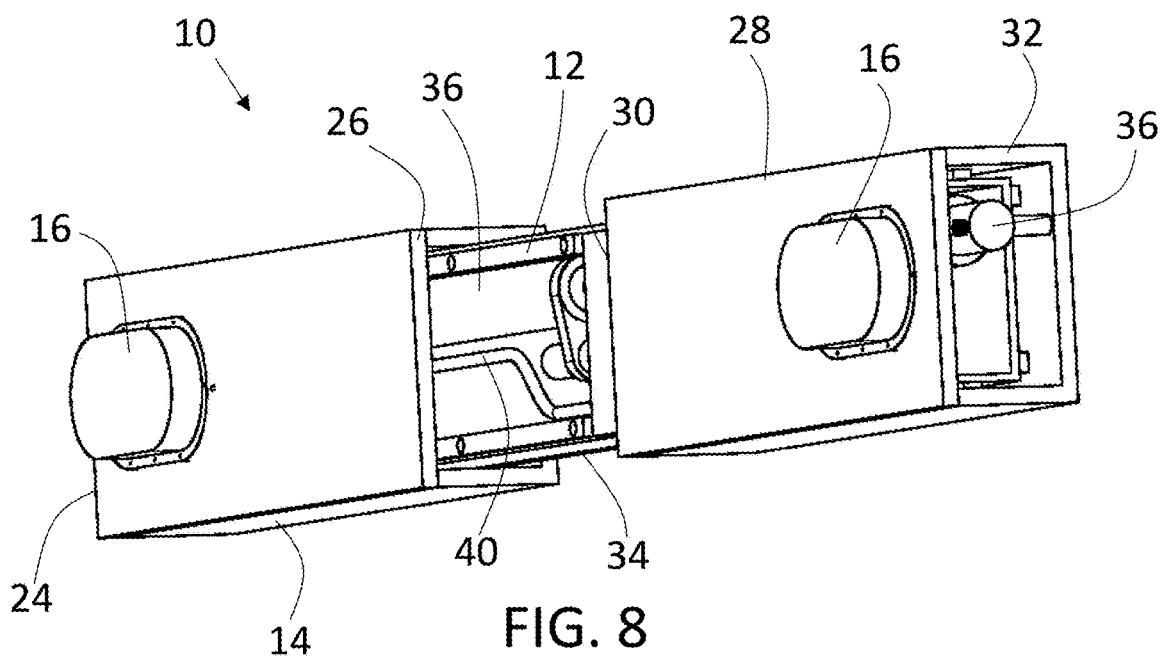
FIG. 8 is a perspective view, partially in section, of the first variation of the extending light bar with one side extended.

Referring to FIG. 6, a second extending arm 28 may be provided. Second extending arm 28 has a first end 30 and a second end 32. First end 30 of second extending arm 28 is positionable adjacent first end 24 of first extending arm 14. Second extending arm 28 slidably engages support body 12 and is movable between a second extended position, shown in FIG. 1, and a second retracted position, shown in FIG. 2. Referring to FIG. 1, in the second extended position, first end 30 of second extending arm 28 moves towards second support end 22 of support body 12. At least one of lights 16 is positioned on second extending arm 28. In the embodiments shown in FIG. 1 to FIG. 2, lights 16 are positioned adjacent second end 26 and 32 of first extending arm 14 and second extending arm 28, respectively. It will be understood by a person skilled in the art that multiple lights may be positioned on each of first extending arm 14 and second extending arm 28 and that different positioning of lights 16 is acceptable. Referring to FIG. 8, first extending arm 14 and second extending arm 28 may be extendable and retractable in tandem or individually depending upon the requirements of the user.

Figure 2:
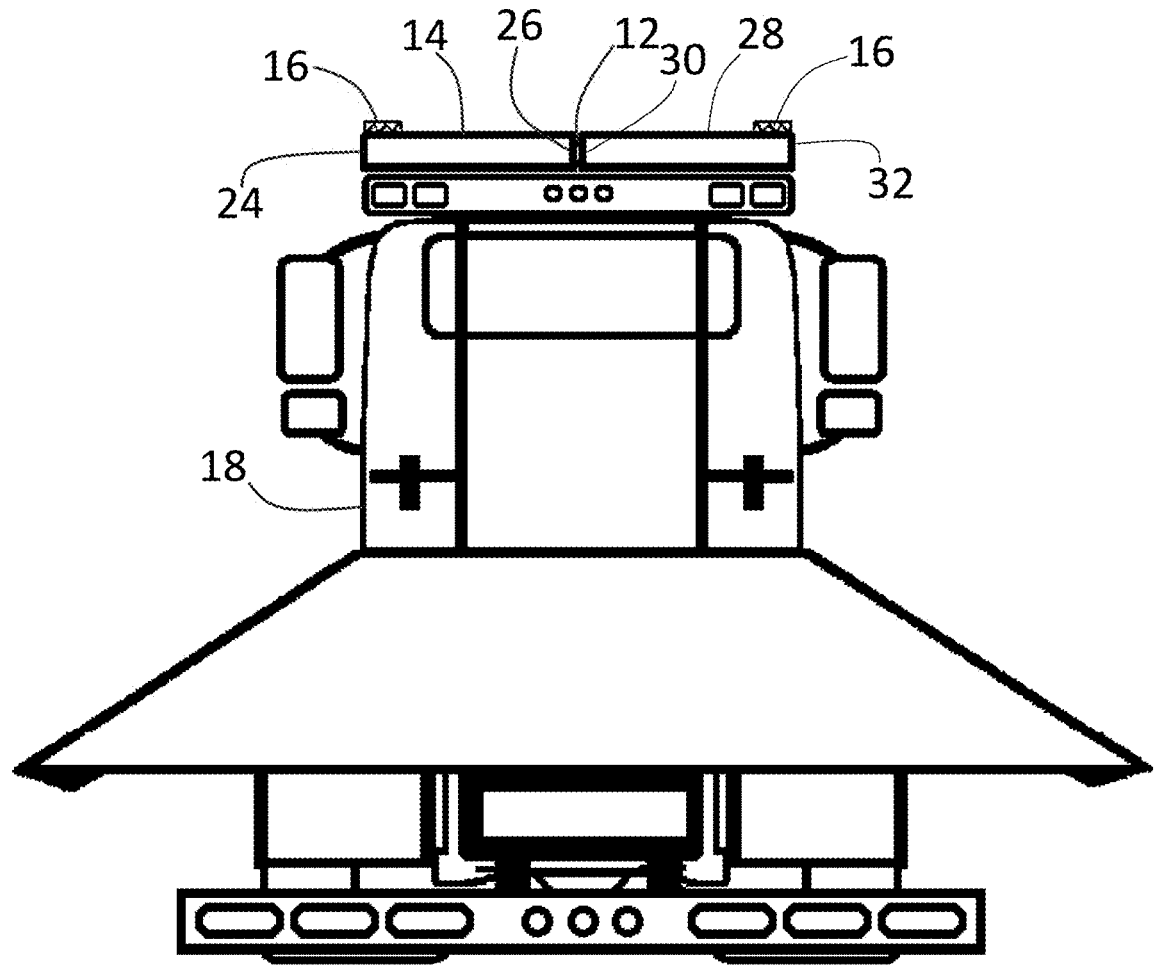
FIG. 2 is a rear elevation view of the first variation of the extending light bar in the retracted position.
Figure 3:
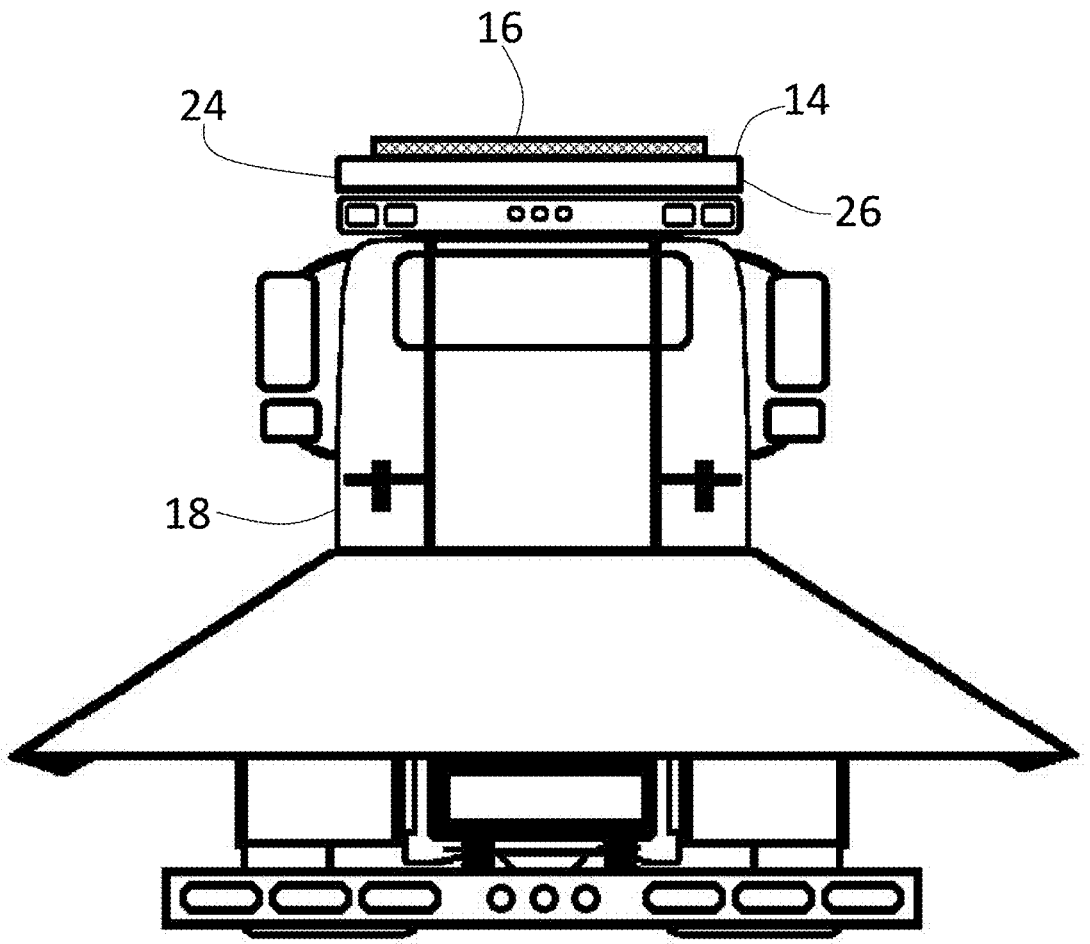
FIG. 3 is a rear elevation view of a second variation of the extending light bar in the retracted position.

In the embodiment shown in FIG. 2, first extending arm 14 and second extending arm 28 are of substantially the same length. In the retracted position, first end 20 of the first extending arm 14 and first end 30 of second extending arm 28 are in contact at a central point of support bar 12. It will be understood by a person of skill in the art that first extending arm 14 and second extending arm 28 may have different lengths and that first ends 20 and 30 are not required to make contact for extending light bar 10 to operate.

In the embodiments shown, both first extending arm 14 and second extending arm 28 slidably engage an exterior surface 34 of support bar 12. It will be understood by a person skilled in the art that first extending arm 14 and second extending arm 28 may slidably engage through an interior surface, not shown, of support bar 12. It will further be understood that one of first extending arm 14 or second extending arm 28 may slidably engage exterior surface 34 of support bar 12 while the other of first extending arm 14 or second extending arm 28 slidably engages interior surface of support bar 12. First extending arm 14 and second extending arm 28 may surround at least a portion of support bar 12 such that first extending arm 14 and second extending arm 28 move laterally relative to support bar 12 when moved between extended and retracted positions. If support bar 12 is mounted to a surface, it may be beneficial for first extending arm 14 and second extending arm 28 to have an elongated aperture to allow for sliding around mounts.

First extending arm 14 and second extending arm 28 may be moved on support bar 12 through manual or mechanical means. In the embodiment shown in FIG. 7-FIG. 11 and FIG. 13, a linear actuator 36, such as a pneumatic cylinder, hydraulic cylinder, screw actuator, electro-mechanical actuator, or any other suitable mechanism allowing for movement of first extending arm 14 and second extending arm 28 on support bar 12. A person of skill will understand how to attach linear actuator 36 to support bar 12 and first extending arm 14 or second extending arm 28 to cause slidable movement of first extending arm 14 or second extending arm 28. Linear actuator 36 may also be used to hold first extending arm 14 and second extending arm 28 in a preferred position on support body 12. It will, however, be understood that an independent locking mechanism may be used to maintain the position of first extending arm 14 and second extending arm 28 on support body 12 and may also be used to prevent or limit unintentional movement when linear actuator is unintentionally activated. In the embodiments shown, a controller 38 is provided for controlling linear actuators 36 and turning lights on and off. Controller 38 is controlled through a wired connection or wireless connection by a handheld device, not shown, or control panel, not shown, that may be mounted in a vehicle for convenience. Electrical connections 40 extend from power source 18, shown as a battery in the present embodiments, to provide power to lights 16.

In the embodiments shown in FIG. 1-FIG. 5, extending light bar 10 is attached to a top of the cab of a truck with a flat deck. It will be understood by a person skilled in the art that extending light bar 10 may be attached to different parts of a vehicle or trailer of any kind. It will further be understood that extending light bar may be used without being attached to a vehicle or trailer.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

5

6

What is claimed is:

1. An extending light bar, comprising:

a support body having a first support end and a second support end, a first extending arm having a first end and a second end, the first extending arm slidably engaging the support body, the first extending arm being movable between a first extended position and a first retracted position, in the first extended position the second end of the first extending arm moving towards the first support end of the support body;

a second extending arm having a first end and a second end, the first end of the second extending arm being positionable adjacent the first end of the first extending arm, the second extending arm slidably engaging the support body, the second extending arm being movable between a second extended position and a second retracted position, in the second extended position the first end of the second extending arm moving towards the second support end of the support body;

at least one light being positioned on the first extending arm and at least one of the at least one lights being positioned on the second extending arm; and a power source for the at least one light.

2. The extending light bar of claim 1 wherein each of the first extending arm and the second extending arm having a locking mechanism for maintaining position on the support body.

3. The extending light bar of claim 1 wherein the power source is a vehicle.

4. The extending light bar of claim 1 wherein the at least one light is a light bar.

5. The extending light bar of claim 1 wherein at least one light being positioned adjacent the second end of the first extending arm.

6. The extending light bar of claim 1 wherein at least one light being positioned adjacent the second end of the second extending arm.

7. The extending light bar of claim 1 wherein the first extending arm is movable along an exterior surface of the support bar.

8. The extending light bar of claim 7 wherein the first extending arm surrounds at least a portion of the support bar such that the first extending arm moves laterally relative to the support bar.

9. The extending light bar of claim 1 wherein the second extending arm is movable along the exterior surface of the support bar.

10. The extending light bar of claim 9 wherein the second extending arm surrounds at least a portion of the support bar such that the first extending arm moves laterally relative to the support bar.

11. The extending light bar of claim 1 wherein the first extending arm is moved manually.

12. The extending light bar of claim 1 wherein the second extending arm is moved manually.

13. The extending light bar of claim 1 wherein the first extending arm is moved by a linear actuator.

14. The extending light bar of claim 1 wherein the second extending arm is moved by a linear actuator.

15. The extending light bar of claim 1 wherein in the retracted position the first end of the first extending arm and the first end of the second extending arm are in contact at a central point of the support bar.

16. The extending light bar of claim 1 wherein the first extending arm is movable to an alternative extended position in which the first end of the first extending arm moves towards the second support end of the support body.

17. The extending light bar of claim 1 wherein the support body is horizontal.

* * * * *